(12) United States Patent
Kalmanje et al.

(10) Patent No.: US 11,128,895 B2
(45) Date of Patent: Sep. 21, 2021

(54) PAUSE AND REPLAY OF MEDIA CONTENT THROUGH BOOKMARKS ON A SERVER DEVICE

(71) Applicant: III Holdings 1, LLC, Wilmington, DE (US)

(72) Inventors: Arun Kalmanje, Sunnyvale, CA (US); Sachin Gupta, Milpitas, CA (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 16/878,268

(22) Filed: May 19, 2020

(65) Prior Publication Data
US 2020/0351526 A1 Nov. 5, 2020

Related U.S. Application Data

(63) Continuation of application No. 15/967,549, filed on Apr. 30, 2018, now Pat. No. 10,701,407, which is a
(Continued)

(51) Int. Cl.
*H04N 21/231* (2011.01)
*H04N 21/2387* (2011.01)
(Continued)

(52) U.S. Cl.
CPC ........... *H04N 21/231* (2013.01); *G11B 27/10* (2013.01); *H04L 65/1083* (2013.01);
(Continued)

(58) Field of Classification Search
CPC ........... H04N 21/231; H04N 21/21805; H04N 21/238; H04N 21/2587; H04N 21/4325;
(Continued)

(56) References Cited

U.S. PATENT DOCUMENTS 4,850,891 A * 7/1989 Walkup .................... G11C 5/04
439/326
5,495,533 A 2/1996 Linehan et al.
(Continued)

FOREIGN PATENT DOCUMENTS

WO    WO 1999015999    4/1999

OTHER PUBLICATIONS

IEEE INFOCOM 2007 proceedings, Kumar et al., Stochastic Fluid Theory for P2P Streaming Systems (Year: 2007).*
(Continued)

*Primary Examiner* — Un C Cho
*Assistant Examiner* — Peter K Mak
(74) *Attorney, Agent, or Firm* — Crowell & Moring, LLP

(57) ABSTRACT

A method, apparatus, and system of pause and replay of media content through bookmarks on a server device are disclosed. In one embodiment, a method of a server device includes authenticating a user of a client device, communicating a media content to the client device through a network, processing a pause request of the client device to pause the media content, storing a bookmark location indicating a current playback location of the media content in the client device on the server device, processing a play request of the user to play the media content from the bookmark location (e.g., the play request may be received from a different client device of the user), and communicating the media content from the bookmark location to the user.

20 Claims, 10 Drawing Sheets

Related U.S. Application Data continuation of application No. 14/050,340, filed on Oct. 10, 2013, now Pat. No. 9,961,374, which is a continuation-in-part of application No. 12/957,425, filed on Dec. 1, 2010, now Pat. No. 8,909,776, which is a continuation-in-part of application No. 12/043,951, filed on Mar. 7, 2008, now Pat. No. 7,890,599.

(51) Int. Cl.

| | | |
|---|---|---|
| H04N 21/472 | (2011.01) | |
| H04L 29/06 | (2006.01) | |
| H04N 21/254 | (2011.01) | |
| H04N 21/433 | (2011.01) | |
| G11B 27/10 | (2006.01) | |
| H04N 7/173 | (2011.01) | |
| H04N 21/218 | (2011.01) | |
| H04N 21/258 | (2011.01) | |
| H04N 21/432 | (2011.01) | |
| H04N 21/6587 | (2011.01) | |
| H04N 21/845 | (2011.01) | |

(52) U.S. Cl.
CPC ...... *H04L 65/4084* (2013.01); *H04L 65/4092* (2013.01); *H04N 7/17309* (2013.01); *H04N 21/21805* (2013.01); *H04N 21/2387* (2013.01); *H04N 21/2541* (2013.01); *H04N 21/25875* (2013.01); *H04N 21/433* (2013.01); *H04N 21/4325* (2013.01); *H04N 21/4333* (2013.01); *H04N 21/47205* (2013.01); *H04N 21/47217* (2013.01); *H04N 21/6587* (2013.01); *H04N 21/8455* (2013.01); *H04N 21/8456* (2013.01)

(58) Field of Classification Search
CPC .......... H04N 21/4333; H04N 21/47205; H04L 65/4084
See application file for complete search history.

(56) References Cited

U.S. PATENT DOCUMENTS

| | | | |
|---|---|---|---|
| 5,732,077 A | 3/1998 | Whitehead | |
| 5,801,985 A * | 9/1998 | Roohparvar | G11C 29/028 365/185.01 |
| 5,930,167 A | 7/1999 | Lee et al. | |
| 6,141,488 A | 10/2000 | Knudson et al. | |
| 6,160,546 A | 12/2000 | Thompson et al. | |
| 6,166,730 A | 12/2000 | Goode et al. | |
| 6,208,335 B1 | 3/2001 | Gordon et al. | |
| 6,314,575 B1 | 11/2001 | Billock et al. | |
| 6,757,906 B1 | 6/2004 | Look et al. | |
| 6,816,904 B1 | 11/2004 | Ludwig et al. | |
| 6,920,110 B2 | 7/2005 | Roberts et al. | |
| 7,024,177 B2 | 4/2006 | Bhasin et al. | |
| 7,035,854 B2 * | 4/2006 | Hsiao | G06F 21/6218 |
| 7,127,633 B1 * | 10/2006 | Olson | G06F 11/2092 714/4.4 |
| 7,243,351 B2 * | 7/2007 | Kundu | G06F 9/505 370/229 |
| 7,475,349 B2 | 1/2009 | Wagner et al. | |
| 7,568,199 B2 * | 7/2009 | Bozak | G06F 9/5072 709/202 |
| 7,650,621 B2 | 1/2010 | Thomas et al. | |
| 8,196,133 B2 * | 6/2012 | Kakumani | G06F 9/4416 717/172 |
| 8,209,397 B2 | 6/2012 | Ahn et al. | |
| 8,214,463 B2 | 7/2012 | Ahn et al. | |
| 8,214,519 B2 | 7/2012 | Ahn et al. | |
| 8,224,925 B2 | 7/2012 | Ahn et al. | |
| 8,266,244 B2 | 9/2012 | Ahn et al. | |
| 8,275,854 B2 | 9/2012 | Ahn et al. | |
| 8,352,583 B2 | 1/2013 | Ahn et al. | |
| 8,364,779 B2 | 1/2013 | Ahn et al. | |
| 8,380,811 B2 | 2/2013 | Ahn et al. | |
| 8,381,109 B2 | 2/2013 | Ahn et al. | |
| 8,458,288 B2 | 6/2013 | Ahn et al. | |
| 8,549,102 B2 | 10/2013 | Ahn et al. | |
| 8,819,165 B2 | 8/2014 | Ahn et al. | |
| 8,819,166 B2 | 8/2014 | Ahn et al. | |
| 8,949,314 B2 | 2/2015 | Ahn et al. | |
| 10,701,407 B2 * | 6/2020 | Kalmanje | G11B 27/10 |
| 2002/0059094 A1 * | 5/2002 | Hosea | H04N 21/25883 725/10 |
| 2002/0059621 A1 | 5/2002 | Thomas et al. | |
| 2003/0078986 A1 | 4/2003 | Ayres et al. | |
| 2003/0126013 A1 * | 7/2003 | Shand | G06Q 30/0269 705/14.52 |
| 2003/0154112 A1 * | 8/2003 | Neiman | G06F 9/5044 705/5 |
| 2004/0015973 A1 * | 1/2004 | Skovira | G06F 9/4881 718/103 |
| 2005/0166258 A1 | 7/2005 | Vasilevsky | |
| 2005/0265701 A1 | 12/2005 | Lamkin et al. | |
| 2005/0276284 A1 | 12/2005 | Krause | |
| 2006/0048157 A1 * | 3/2006 | Dawson | G06F 9/5072 718/104 |
| 2006/0092938 A1 | 5/2006 | Gentrix | |
| 2006/0168227 A1 | 7/2006 | Levine et al. | |
| 2006/0267995 A1 | 11/2006 | Radloff et al. | |
| 2007/0011709 A1 | 1/2007 | Katz | |
| 2007/0053653 A1 | 3/2007 | Huntington | |
| 2007/0130210 A1 | 6/2007 | Park | |
| 2007/0169159 A1 | 7/2007 | Aaby et al. | |
| 2007/0204006 A1 | 8/2007 | Vallis | |
| 2008/0126919 A1 | 5/2008 | Uskali et al. | |
| 2008/0140433 A1 | 6/2008 | Levy et al. | |
| 2008/0189745 A1 | 8/2008 | Hassell et al. | |
| 2008/0215553 A1 * | 9/2008 | Badros | A61N 1/36057 |
| 2008/0228821 A1 | 9/2008 | Mick et al. | |
| 2008/0263608 A1 | 10/2008 | White | |
| 2009/0187762 A1 | 7/2009 | Okamoto et al. | |
| 2011/0063317 A1 * | 3/2011 | Gharaat | G06Q 30/04 345/545 |
| 2011/0179134 A1 * | 7/2011 | Mayo | H04L 12/1822 709/214 |
| 2012/0087634 A1 * | 4/2012 | Lalwaney | H04L 67/10 386/241 |
| 2015/0070516 A1 * | 3/2015 | Shoemake | H04N 21/4223 348/207.11 |
| 2016/0048485 A1 * | 2/2016 | Sherwood | G06F 16/9574 715/234 |
| 2019/0075333 A1 | 3/2019 | Kalmanje et al. | |

OTHER PUBLICATIONS

IEEE Xplore, Kim et al., Video bookmark for interactive television (Year: 2007).*

Caesar et al., "Design and Implementation of a Routing Control Platform," Usenix, NSDI '05 Paper, Technical Program, obtained from the Internet, on Apr. 13, 2021, at URL <https://www.usenix.org/legacy/event/nsdi05/tech/full_papers/caesar/caesar_html/>, 23 pages.

* cited by examiner

| MEDIA CONTENT 400 | MEDIA CONTENT 402 | TYPE 404 | LENGTH 406 | PAUSE TIME 408 | DELAY IN SERVER 410 | PLAYBACK TIME 412 |
|---|---|---|---|---|---|---|
| JOLLY | MOVIE CLIP | STORABLE | 30.00 MIN | 16.00 MIN | 0.003mSEC | 14.00 MIN |
| RYAN LAM | NEWS | LIVE | 25.00 MIN | 10.00 MIN | 0.001mSEC | 15.00 MIN |
| • | • | • | • | • | • | • |
| • | • | • | • | • | • | • |
| • | • | • | • | • | • | • |

PAUSE AND REPLAY OF MEDIA CONTENT THROUGH BOOKMARKS ON A SERVER DEVICE

CLAIM OF PRIORITY

This application is a Continuation of and claims priority to U.S. patent application Ser. No. 15/967,549, filed on Apr. 30, 2018, which is a Continuation of and claims priority to U.S. patent application Ser. No. 14/050,340, filed on Oct. 10, 2013 (now U.S. Pat. No. 9,961,374), which is a Continuation-In-Part (CIP) of and claims priority to U.S. patent application Ser. No. 12/957,425, filed on Dec. 1, 2010 (now U.S. Pat. No. 8,909,776), which is a Continuation-In-Part (CIP) of and claims priority to U.S. patent application Ser. No. 12/043,951, filed on Mar. 7, 2008 (now U.S. Pat. No. 7,890,599), each of which are hereby incorporated by reference in their entirety.

FIELD OF TECHNOLOGY

This disclosure relates to generally to a capture method, a technical field of software and/or hardware technology and, in one example embodiment, to pause and replay of media content through bookmarks on a server device.

BACKGROUND

A user of a client device (e.g., a personal computer, a mobile phone, a network-connected television, a set-top box coupled to a standard television, etc.) may play a media content (e.g., a video content, an audio content, a multimedia content, a textual content, etc.) that is streamed to the client device from a server device (and/or a content server) through a network (e.g., Internet, LAN, WAN, etc.). An owner of the media content may not permit the user to download the media content to the client device for a variety of reasons (e.g., copyright license restrictions, etc.).

The user of the client device may not be able to view the media content in a single viewing session (e.g., because of time constraints). An indicator (e.g., a pointer) may be stored on a memory buffer (e.g., local storage) of the client device associated with a location where the user paused a playback of the media content being streamed from the server when the media content is played from a client-side media player (e.g., Microsoft® Windows Media Player®, Apple® Quick-Time® player, Adobe® Flash Player® etc.). However, an application (e.g., a browser, the client-side media player, etc.) of the client device may delete the indicator after occurrence of an event (e.g., when the application is closed, after a period of time, etc.).

Sometimes, the user of the client device may wish to use different client devices to finish playing the media content across multiple viewing sessions. When the media content is streamed from the server through the network, the user may need to replay the media content in its entirety when they use different client devices to play portions of the media content. The user may waste time in repeatedly viewing portions of the media content that the user has previously seen. In some instances, the user may decide not to view the media content at all. As a result, the owner of the media content may lose valuable opportunities to distribute the media content through streaming.

SUMMARY

A method, apparatus, and system of pause and replay of media content through bookmarks on a server device are disclosed. In one aspect, a method of a server device includes authenticating a user of a client device; communicating a media content to the client device through a network; processing a pause request of the client device to pause the media content; storing a bookmark location indicating a current playback location of the media content in the client device on the server device; processing a play request of the user to play the media content from the bookmark location (e.g., the play request of the user to play the media content from the bookmark location may be received from a different client device of the user); and communicating the media content from the bookmark location to the user.

The media content may be received from a standard content server through the network. The portion of the media content remaining to be communicated to the client device may be copied from the standard content server to the server device based on the bookmark location. The media content remaining to be communicated to the client device may be transmitted from the server device to the client device without involving the standard content server (e.g., when the play request of the user to play the media content from the bookmark location is processed by the server device). The portion of the media content remaining to be communicated to the client device may be deleted from the server device (e.g., after transmitting the media content when the play request of the user to play the media content from the bookmark location is fulfilled). The media content may broadcast live from the standard content server without storage on the standard content server. The standard content server may aggregate the media content from user generated content communities and/or professional media providers. The media content may be at least 3 minutes in length. The pause request of the client device to pause the media content may be stored temporarily on the client device immediately after the user presses a pause indicator on an application of the client device (e.g., to reduce an amount of time between when the user presses the pause indicator and when the pause request may be processed by the server device when a client-side media player is used to playback the media content). The pause request may include a relative amount of time of a session of viewing the media content on the client device during the session.

The method may continuously buffer on the server device at least a portion of the media content equivalent to an average amount of time of delay between when the user presses the pause indicator on the application of the client device and when the pause request is processed by the server device (e.g., such that the server device is able to adjust a location of the bookmark to a relative time phase of when the user pressed the pause indicator on the application of the client device). The user may press the pause indicator through a remote control, a voice command, a pointing device action, and/or a tactile command. The media content may be stored in a local storage coupled to the server device.

The media content may be received from an advanced content server through the network. An Application Programming Interface (API) of the advanced content server may be applied that enables the server device to play the portion of the media content remaining to be communicated to the client device based on the bookmark. The portion of the media content remaining to be communicated to the client device may be played based on the bookmark directly from the advanced content server (e.g., when the play request of the user to play the media content from the bookmark location on the server device is processed by the server device). A social community of users may be formed around bookmark locations of different users across different ones of the media content in a community pausing network (e.g., such that users of the community pausing network share paused locations of media content with each other through profiles associated with each user of the community pausing network). The user may be automatically authenticated through a unique hardware identifier of the client device. The client device may be a personal computer, a mobile phone, a network-connected television, and/or a set-top box coupled to a standard television.

In another aspect, a system includes a client device to playback a media content from a pause location through a bookmark; a network; and a server device to store the bookmark associated with the pause location, and to stream the media content to the client device. A standard content server may transmit the media content being streamed to the server device. The server device may store content from the pause location to a completion point of the media content based on the bookmark (e.g., when the standard content server is used to transmit the media). An advanced content server having an Application Programming Interface (API) may transmit the media content being streamed to the server device. The server device may use the bookmark to reference the pause location directly in the advanced content server. In addition, the server device may be used to directly stream the media content from the pause location of the advanced content server (e.g., when a play request of the client device to play from the pause location is processed by the server device).

In yet another aspect, a method of a server device includes creating a bookmark in response to a pause request of a client device to pause a media content being streamed from the server device; and storing the bookmark and other bookmarks associated with pause locations of other users in a server device without duplicating the media content in separate files for each user creating the pause locations on the server device. The pause locations may be shared in user profiles of each of the users creating the pause locations (e.g., such that users highlight and comment on pause locations of interest to them to other users). The media content may be pre-processed after receiving the media content from a content server external to the server device (e.g., such that the pre-processing enables a buffering of at least a portion of the media content in the server device prior to transmitting the media content to the client device).

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view of a user table having a variety of fields, according to one embodiment.

Figure 1:
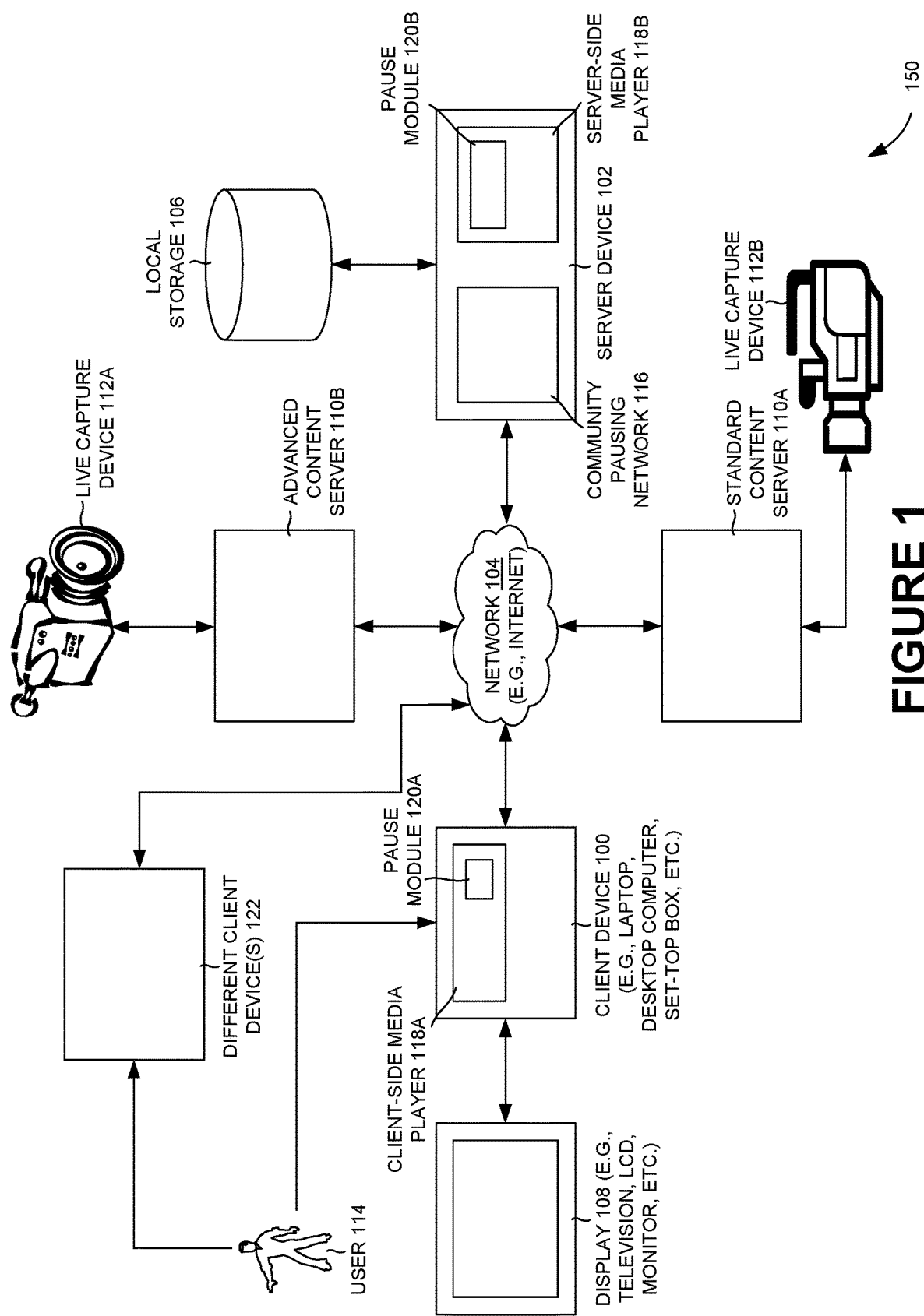
FIG. 1 is a system view of a client device communicating with a server device through a network, according to one embodiment.

Other features of the present embodiments will be apparent from the accompanying drawings and from the detailed description that follows.

DETAILED DESCRIPTION

A method, apparatus, and system of pause and replay of media content through bookmarks on a server device are disclosed. Although the present embodiments have been described with reference to specific example embodiments, it will be evident that various modifications and changes may be made to these embodiments without departing from the broader spirit and scope of the various embodiments.

In one embodiment, a method of a server device (e.g., the server 102 of FIG. 1) includes authenticating a user (e.g., the user 114 of FIG. 1) of a client device (e.g., the client device 100 of FIG. 1), communicating a media content (e.g., the media content 322 of FIG. 3) to the client device 100 through a network (e.g., the network 104 of FIG. 1), processing a pause request of the client device 100 (e.g., a computer, a mobile device, etc.) to pause the media content 322 (e.g., a live streaming video, an audio, etc.), storing a bookmark location indicating a current playback location of the media content 322 in the client device 100 on the server device 102, processing a play request of the user 114 to play the media content 322 from the bookmark location, and communicating the media content 322 from the bookmark location to the user 114.

In another embodiment, a system includes a client device (e.g., the client device 100 of FIG. 1); to playback a media content (e.g., the media content 322 of FIG. 3) from a pause location through a bookmark, a network (e.g., the network 104 of FIG. 1); and a server device (e.g., the server device 102 of FIG. 1), to store the bookmark associated with the pause location, and to stream the media content 322 to the client device 100.

In yet another embodiment, a method of a server device (e.g., the server device 102 of FIG. 1) includes creating a bookmark in response to a pause request of a client device (e.g., the client device 100 of FIG. 1) to pause a media content (e.g., the media content 322 of FIG. 3) being streamed from the server device 102, and storing the bookmark and other bookmarks associated with pause locations of other users (e.g., the user 114 and other users) in a server device 102 without duplicating the media content 322 in separate files for each user 114 creating the pause locations on the server device 102.

FIG. 1 is a system view of a client device 100 communicating with a server device 102 through a network 104, according to one embodiment. Particularly, FIG. 1 illustrates the client device 100, the server device 102, the network 104, a local storage 106, a display 108, a standard-content 110A, an advanced content server 110B, a live capture device 112A, a live capture device 112B, a user 114, a community pausing network 116, a client-side media player 118A, a server-side media player 118B, a pause module 120A, a pause module 120B, and a different client device(s) 122, according to one embodiment.

The client device 100 may be a laptop, a desktop computer, a set-top box, etc which may play the media content 322 associated with the interest of the user 114 from the server device 102. The server device 102 may be a web server, a host of a community pausing network, a server application, an operating system, a computer, and/or an appliance having data content (e.g., video, audio, etc.). The network 104 may be a local area network, a wide area network, an Internet network, etc which may provide a bridge for the client device 100 to communicate with the server devices (e.g., the server device, standard content server 110A, advanced content server 110B, etc.). The local storage 106 may be a hard drive coupled to the server device 102 and/or a Redundant Array of Independent Disks (RAID) which may store data contents associated with the server device 102.

The display 108 may be a television, a Liquid Crystal Display (LCD), a monitor, etc, which may display media content. The standard content server 110A may be a provider of content providing traditional access to media (e.g., no API access). The live-capture devices 112 may be a video camera, a motion camera, and/or another videography device which may be used to upload media content to the server (e.g., the standard server 110A, the advanced content server 110B, etc.). The user 114 may be an individual who operates either one or both of the client device 100 and/or the different client device(s) 122.

The community pausing network 116 may be a social network of users who share information with each other related to pausing of video (e.g., halting briefly, stopping, etc.). The media players 118 may be software (and/or hardware) for playing multimedia files (e.g., video, audio, etc.) either from a client side (e.g., using the client-side media player 118A) or a server side (using the server-side media player 118B). The pause module 120A and the pause module 120B may enable the user 114 to temporarily halt the playback of video content. The different client devices 122 may be computers, mobile devices, etc. which are accessible by the user 114. The advanced content server 110B may be a provider of content having advanced functionality (e.g., API level access). The user 114 of the client device 100 may be authenticated on the server device 102 and/or may use the services offered by the server devices 102.

In example embodiment, the user 114 may use the client device 110 and/or display devices 108 for accessing the media contents 322 from the servers (e.g., the server device 102, standard content server 110, advanced content server 110B, etc.) through network 104 (e.g., through internet, etc.) and to pause and replay from the point of pause using the pause modules 120A and 120B. The live capture devices 112A and/or 112B may provide input (e.g., media content 322, etc.) to the server devices (e.g., standard content server 110, advanced content server 110B). The media content may be stored in server device 102. The server device may include the community pausing network 116 and client side media player 118B. the client device 100 may include the pause module 120A and the client side media player 118A (e.g., Microsoft® Windows Media Player®, Apple® QuickTime® player, Adobe® Flash Player® etc.).

In one embodiment, the user 114 may be automatically authenticated through a unique hardware identifier of the client device 100 (e.g., IP address, MAC number, etc.). The pause locations may be shared in user profiles of each of the users (e.g., the user 114 and other users) creating the pause locations, such that the users 114 highlight and comment on pause locations of interest to them to other users.

Figure 2:
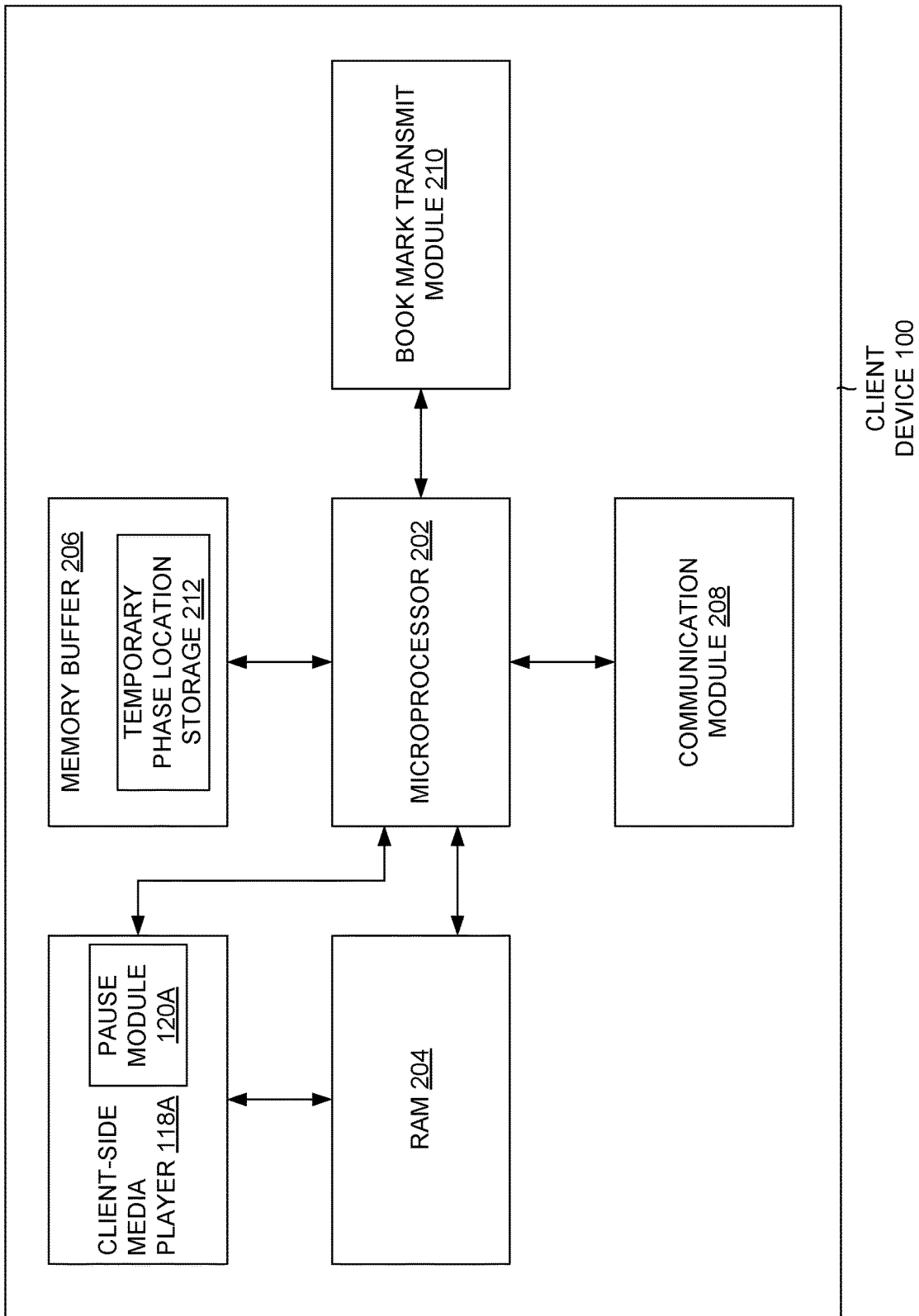
FIG. 2 is an exploded view of the client device of FIG. 1, according to one embodiment.

FIG. 2 is an exploded view of the client device 100 of FIG. 1, according to one embodiment. Particularly, FIG. 2 illustrates a client device 100 having a microprocessor 202, a Random Access Memory (RAM) 204, a memory buffer 206, a communication circuit 208, an bookmark transmit module 210, and temporary phase location storage 212, according to one embodiment.

The microprocessor 202 may incorporate the functions of a central processing unit (CPU) on an integrated circuit (IC). The Random Access Memory (RAM) 204 may be a temporary storage memory when processing information in the client device 100. The memory buffer 206 may be cache, RAM, flash memory, etc. The communication module 208 may permit the client device 100 to communicate with the server device 102 through the network 104 (e.g., through internet).

The bookmark transmit module 210 may transmit a bookmark of a pause location from the client device 100 to the server device 102. The temporary phase location storage 212 may store temporarily the media content 322 (e.g., video, audio, multimedia, etc.) received from the server device 102 and/or pause locations captured by the pause module 120A.

In an example embodiment shown in FIG. 2, the microprocessor 202 is illustrated as communicating with the communication circuit 208, the RAM 204, and the memory buffer 206 and the bookmark transmit module 210, and the client-side media player 118A. The client side media player 118A is illustrated in the example embodiment of FIG. 2 as communicating with the RAM 204.

Figure 3:
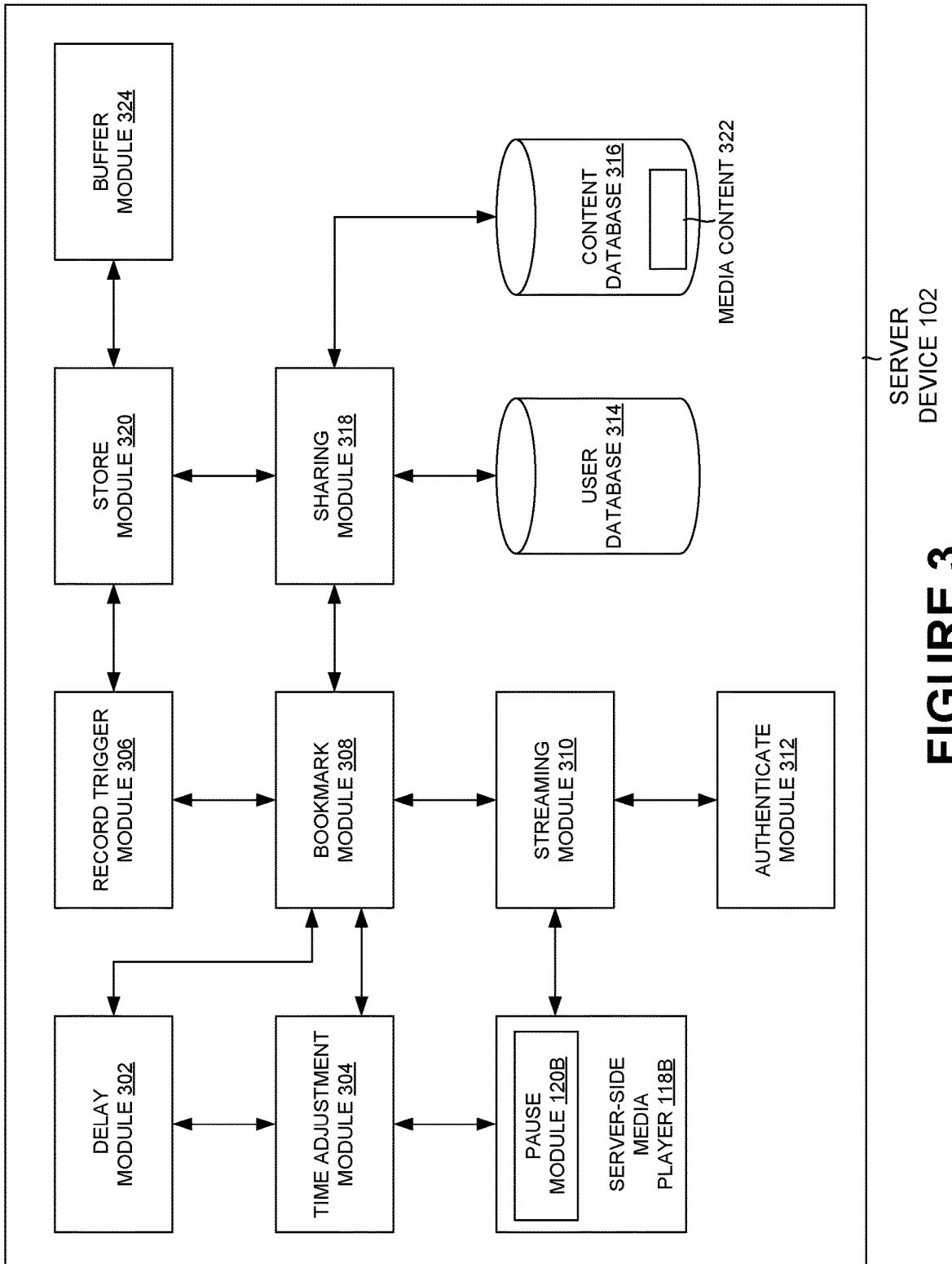
FIG. 3 is an exploded view of the server device of FIG. 1, according to one embodiment.

FIG. 3 is an exploded view of the server device of FIG. 1, according to one embodiment. Particularly, FIG. 3 illustrates a server device 102 having a delay module 302, a time adjust module 304, a record trigger module 306, a bookmark module 308, a streaming module 310, an authenticate module 312, a user database 314, a content database 316, a sharing module 318, a store module 320, a media content 322, and a buffer module 324, according to one embodiment.

The delay module 302 may calculate an average amount of time of delay between transmitting the media content from the server device 102 to the client device 100. The time adjust module 304 may adjust a location of the bookmark to a relative time phase (e.g., to derive exact pause time). The record trigger module 306 may allow the server device 102 to record and store a media data (e.g., streaming media data, motion picture data, live capture data, etc.). The bookmark module 308 may reference the pause location directly in the advanced content server 110B. The streaming module 310 may stream the media content 322 (e.g., audio, video, etc.) from the server device 102 to the client device 100.

The authenticate module 312 may be used to verify that the user 114 is authorized to view the media content 322. The user database 314 may be a database of the registered users (e.g., name of the user, address of the user, etc). The content database 316 may include media content 322 (e.g., movies, shows, video data, multimedia data, etc.) which is stored in the server 102. The sharing module 318 may share pause locations in the media content 322 of a particular user (e.g., the user 114) with other users. The store module 320 may store the media content 322 in a local storage 106 coupled to the server device 102. The media content 322 may be video content that is at least 3 minutes in length. The buffer module 324 may allow the media content 322 to buffer (e.g., temporarily store in an area of memory that allows quick access) on the server device 102.

In an example embodiment illustrated in FIG. 3, the bookmark module 308 is illustrated as communicating with the delay module 302, the time adjustment module 304, the record trigger module 306, the sharing module 308, and the streaming module 310. The delay module 302 is illustrated as communicating with the time adjust module 304. The time adjust module 304 is illustrated as communicating with the server-side media player 118B. The server-side media player 118B is illustrated as communicating with the streaming module 310. The server side media player 118B may include a pause module 120B. The streaming module 310 is illustrated as communicating with the authenticate module 312. The sharing module 318 is illustrated as connected to the store module 320 and the user database 314, and the content database 316. The content database 316 is illustrated as including the media content 322. Furthermore, the store module 320 is illustrated as communicating with the buffer module 324 in FIG. 3

In one embodiment, the media content 322 may be communicated to the client device 100 through a network 104. A pause request of the client device 100 may be processed to pause the media content 322. The bookmark location (e.g., using the bookmark module 308) indicating a portion of the media content 322 remaining to be communicated to the client device 100 may be stored on the server device 102. A play request of the user 114 may be processed to play the media content 322 from the bookmark location (e.g., using the bookmark module 308). The media content 322 from the bookmark location (e.g., using the bookmark module 308) may be communicated to the user 114.

The play request of the user 114 to play the media content 322 from the bookmark location (e.g., using the bookmark module 308) may be received from a different client device 100 of the user 114. The media content 322 may be received from a standard content server 110A through the network 104 (e.g., may be through internet, etc.). The portion of the media content 322 remaining to be communicated to the client device 100 from the standard content server 110A to the server device 102 may be copied based on the bookmark location (e.g., using the bookmark module 308). The media content 322 remaining to be communicated to the client device 100 may be transmitted from the server device 102 to the client device 100 without involving the standard content server 110A when the play request of the user 114 to play the media content 322 from the bookmark location is processed by the server device 102. The portion of the media content 322 remaining to be communicated to the client device 100 may be deleted from the server device 102 after transmitting the media content 322 when the play request of the user 114 to play the media content 322 from the bookmark location (e.g., using the bookmark module 308) is fulfilled.

The media content 322 may broadcast live (e.g., using the live capture devices 112) from the standard content server 110A without storage on the standard content server 110A. The standard content server 110A may aggregate the media content 322 from user generated content communities and professional media providers (e.g., through a community pausing network 116). The media content 322 may be at least 3 minutes in length. The pause request may include a relative amount of time of a session of viewing the media content 322 on the client device 100 during the session.

The media content 322 may be stored in the local storage 106 coupled to the server device 102. The media content 322 may be received from the advanced content server 110B through the network 104. An Application Programming Interface (API) of the advanced content server 110B may be applied that enables the server device 102 to play the portion of the media content 322 remaining to be communicated to the client device 100 based on the bookmark. The portion of the media content 322 remaining to be communicated to the client device 100 may play based on the bookmark directly from the advanced content server 110B when the play request of the user 114 to play the media content 322 from the bookmark location (e.g., using the bookmark module 308) on the server device 102 may be processed by the server device 102.

The social community of users 114 may be formed around bookmark location (e.g., using the bookmark module 308) of different users across different ones of the media content 322 in a community pausing network 104 (e.g., such that users of the community pausing network 104 share paused locations of media content 322 with each other through profiles associated with each user of the community pausing network 104). The server device 102 may store the bookmark associated with the pause location, and/or to stream the media content 322 to the client device 100.

The standard content server 110A may transmit the media content 322 being streamed to the server device 102. The server device 102 may store content from the pause location (e.g., time of the user 114 pauses the media playback) to a completion point of the media content 322 based on the bookmark (e.g., the time of pause location associated with the media content 322) when the standard content server 110A is used to transmit the media. The advanced content server 110B having an Application Programming Interface (API) may transmit the media content 322 being streamed to the server device 102. The server device 102 to use the bookmark to reference the pause location directly in the advanced content server 110B and to directly stream the media content 322 from the pause location of the advanced content server 110B when a pause request of the client device 100 to play from the pause location may be processed by the server device 102. The bookmark and/or other bookmarks associated with pause locations of other users in a server device 102 may be stored without duplicating the media content 322 in separate files for each user 114 creating the pause locations on the server device 102.

The standard content server 110A may be transmitted the media content 322 being streamed to the server device 102. The server device 102 may store content from the pause location to a completion point of the media content 322 based on the bookmark when the standard content server 110A is used to transmit the media. The advanced content server 110B having an Application Programming Interface (API) may transmit the media content 322 being streamed to the server device 102. The server device 102 may use the bookmark to reference the pause location directly in the advanced content server 110B and may directly stream the media content 322 from the pause location of the advanced content server 110B when a play request of the client device 100 to play from the pause location may be processed by the server device 102. The bookmark and/or other bookmarks associated with pause locations of other users 114 in the server device 102 may be stored without duplicating the media content 322 in separate files for each user 114 creating the pause locations on the server device 102.

The bookmark in response to a pause request of a client device 100 may be created to pause the media content 322 being streamed from the server device 102. The bookmark and other bookmarks associated with pause locations of other users in a server device 102 may be stored without duplicating the media content 322 in separate files for each user creating the pause locations on the server device 102. The media content 322 may be pre-processed after receiving the media content 322 from a content server external to the server device 102 (e.g., such that the pre-processing enables a buffering of a portion of the media content 322 in the server device 102 prior to transmitting the media content 322 to the client device 100).

FIG. 4 is a table view of a user table having a variety of fields, according to one embodiment. Particularly, FIG. 4 illustrates a user field 400, a media content field 402, a type field 404, a length field 406, a pause time field 408, a delay in server field 410, and a playback time field 412, according to one embodiment.

The user field 400 may be a field where user names are represented. The media content field 402 may be a field that indicates what type of media content 322 is being described. The type field 404 may indicate what type of media content 322 is being stored. The length field 406 may be a field that describes how long is a particular media content 322 in duration The pause time field 408 may indicate a location in the media content 322 where the user 114 paused the media content 322. The delay in server field 410 may be a field where delay between a time of pause and a time of record (e.g., in a standard content server scenario) is stored. The playback time field 412 may be a field having records that indicate how much playback time after the user 114 indicates a pause function remains in a particular media content 322.

In example embodiment, the user field 400 of FIG. 4 illustrates two users, a user 'Jolly' and a user 'Ryan Lam'. The media content field 402 of FIG. 4 illustrates that a 'movie' is associated with the user 'Jolly' and a 'newscast' is associated with the user 'Ryan Lam'. The 'movie' of the media content field 402 is associated is storable (as indicated in the type field 404), has a length of 30 minutes (as indicated in the length field 406), has a pause time of 16 minutes (as indicated in the pause time field 408), has a delay of 0.0003 mSec (as indicated in the delay in server 410), and a playback time of 14 minutes (as indicated in the playback time field 412). The 'newscast' of the media content field 402 is storable (as indicated in the type field 404), has a length of 25 minutes (as indicated in the length field 406), has a pause time of 10 minutes (as indicated in the pause time field 408), has a delay of 0.0001 mSEC (as indicated in the delay in server 410), and a playback time of 15 minutes (as indicated in the playback time field 412).

Figure 5:
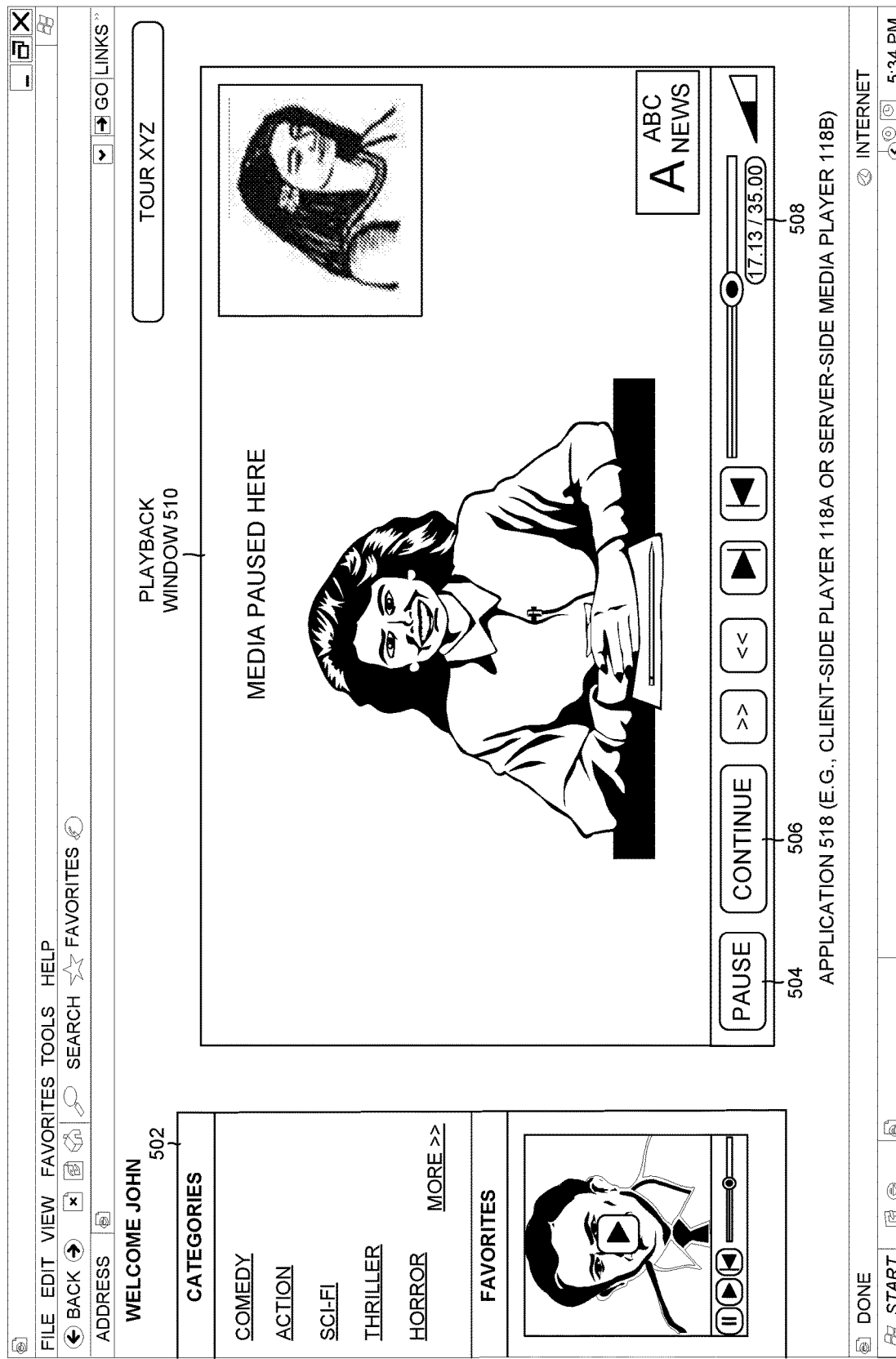
FIG. 5 is a user interface view of an application illustrating pause and continue, according to one embodiment.

FIG. 5 is a user interface view 550 of an application illustrating pause and continue, according to one embodiment. Particularly, FIG. 5 illustrates a categories selector 502, a pause indicator 504, a continue indicator 506, a time duration indicator 508, and a playback window 510, according to one embodiment.

The categories selector 502 may allow the user 114 to select from a variety of categories (e.g., comedy, action, sci-fi, thriller, horror, etc). The pause button 504 may allow the user 114 to pause a particular media shown in the playback window 510. The continue button 506, may enable the user 114 to continue playing the particular media shown in the playback window 510. The time duration indicator 508 may display information about how much of the particular media shown in the playback window 510 has been played. The playback window 510 displays the media content 322 being played.

Figure 6:
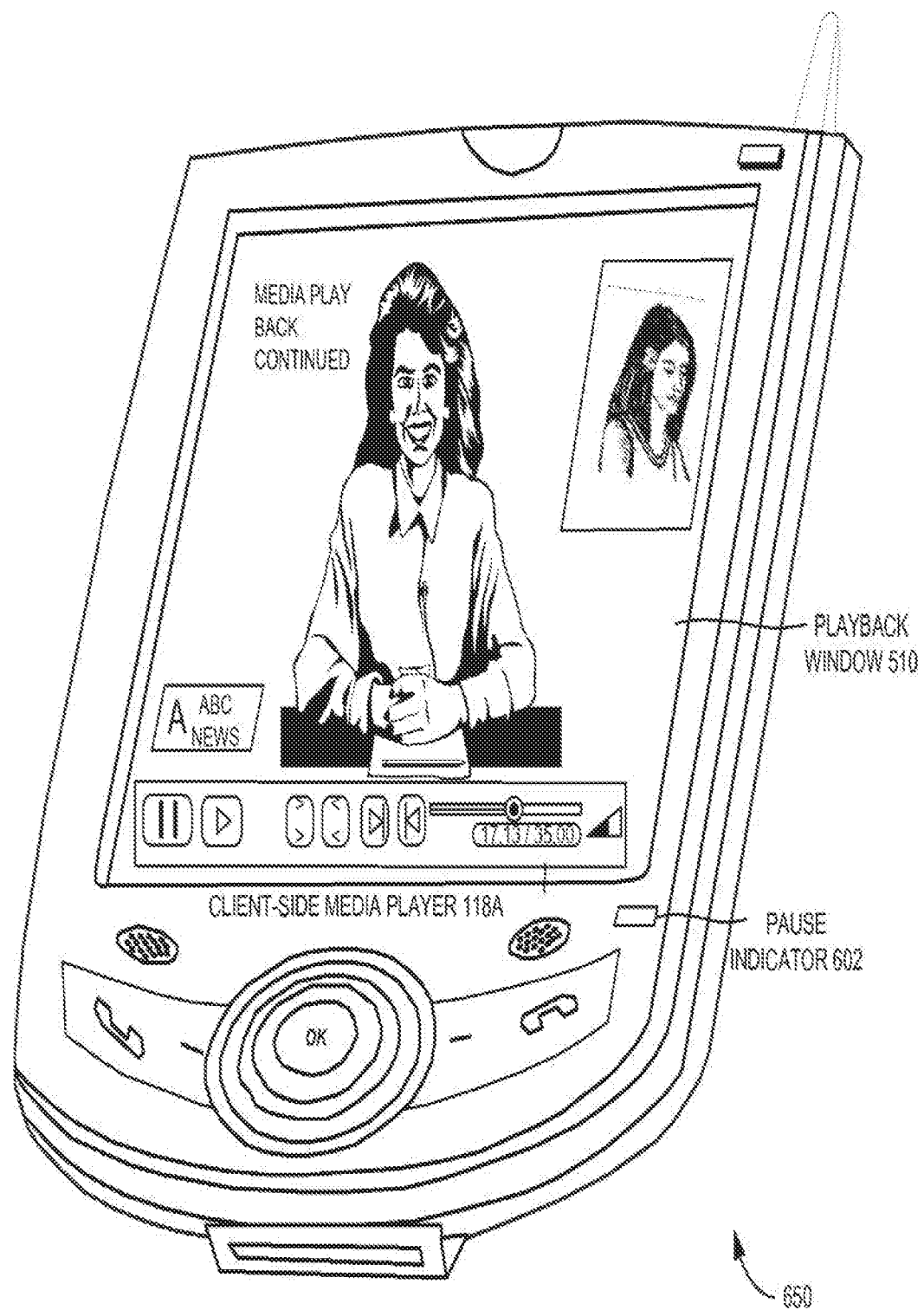
FIG. 6 is a user interface view of a mobile device, according to one embodiment.

FIG. 6 is a user interface view of a mobile device 650, according to one embodiment. Particularly, the mobile device 650 is illustrated as having a pause indicator 602. In addition, the playback window 510 is illustrated in FIG. 6.

The pause indicator 602 may be the break key used in the mobile device 650 to pause a video being played in the playback window 510. The playback window 510 may be allowed to stop the media content 322 in the playback window 510.

In one embodiment, a pause request of the client device 100 to pause the media content 322 may be stored temporarily on the client device 100 immediately after the user 114 presses a pause indicator 602 on an application 518 of the client device 100 (e.g., to reduce an amount of time between when the user 114 presses the pause indicator 602 and when the pause request may be processed by the server device 102 when a client-side media player 118A is used to playback the media content 322). On the mobile device 650 of FIG. 6, when the user 114 presses the pause indicator 602 on the application 518 of the mobile device 650, a portion of the media content 322 equivalent to an average amount of time of delay between when the user 114 presses the pause indicator on the application 518 of the mobile device 650 may be continuously buffered (using the buffer module 324) on the server device 102. The server device 102 may be able to adjust a location of the bookmark (e.g., using the time-adjustment module 304) to a relative time phase of when the user 114 pressed the pause indicator 602 on the application 518 of the mobile device 650. The mobile device 650 may playback a media content 322 from a pause location through a bookmark (e.g., as illustrated in FIG. 5 and in FIG. 6). In alternate embodiments, the user 114 may use the pause indicator 602 through a remote control, a voice command, a pointing device action, and a tactile command.

Figure 7:
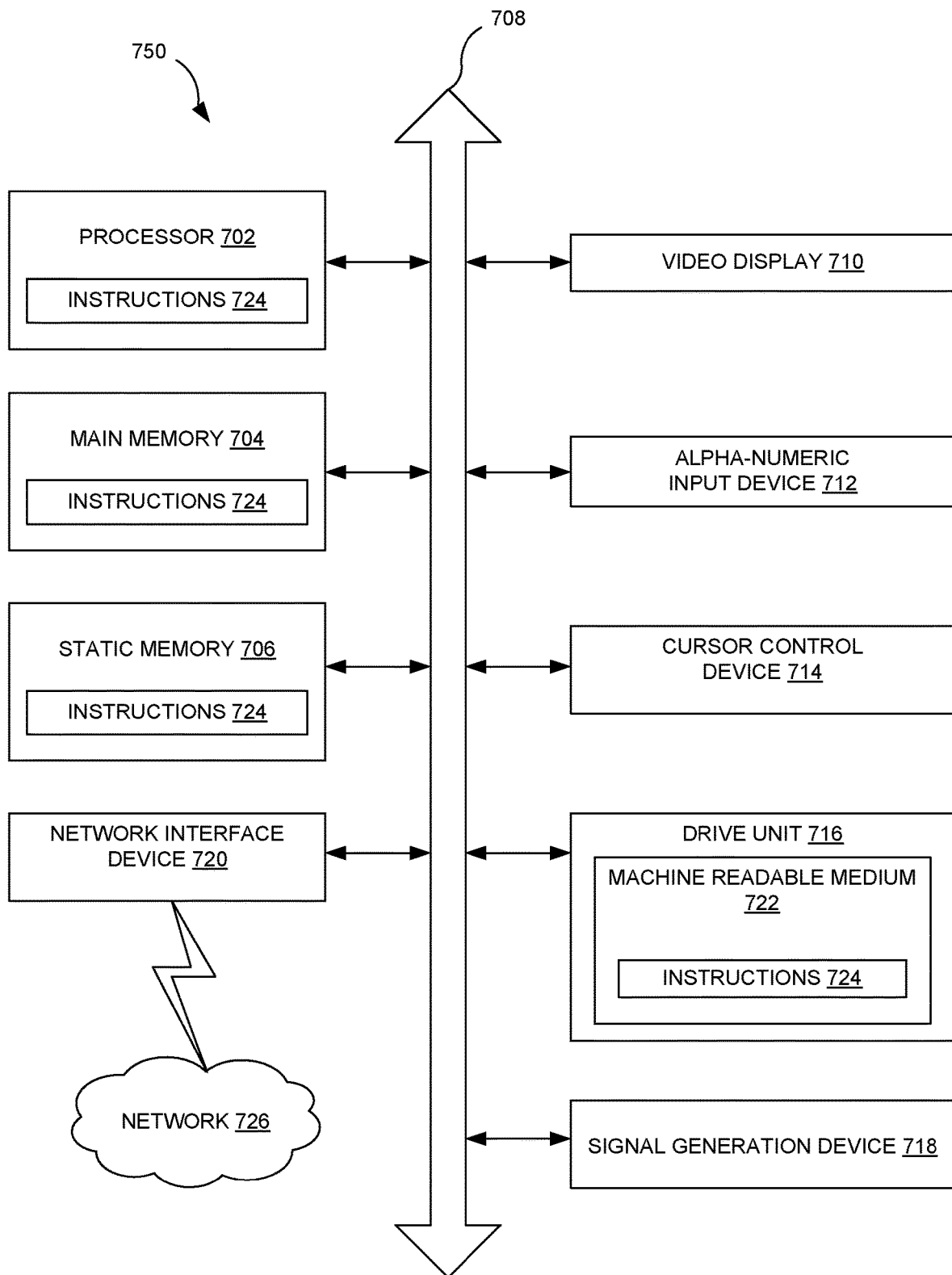
FIG. 7 is a diagrammatic system view of a data processing system in which any of the embodiments disclosed herein may be performed, according to one embodiment.

FIG. 7 is a diagrammatic system view of a data processing system in which any of the embodiments disclosed herein may be performed, according to one embodiment.

Particularly, the diagrammatic system view 700 of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724, and a network 726, according to one embodiment.

The diagrammatic system view 700 may indicate a personal computer and/or the data processing system in which one or more operations disclosed herein are performed. The processor 702 may be a microprocessor, a state machine, an application specific integrated circuit, a field programmable gate array, etc. (e.g., Intel® Pentium® processor). The main memory 704 may be a dynamic random access memory and/or a primary memory of a computer system.

The static memory 706 may be a hard drive, a flash drive, and/or other memory information associated with the data processing system. The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically handicapped).

The cursor control device 714 may be a pointing device such as a mouse. The drive unit 716 may be the hard drive, a storage system, and/or other longer term storage subsystem. The signal generation device 718 may be a bios and/or a functional operating system of the data processing system. The network interface device 720 may be a device that performs interface functions such as code conversion, protocol conversion and/or buffering required for communication to and from the network 726. The machine readable medium 722 may provide instructions on which any of the methods disclosed herein may be performed. The instructions 724 may provide source code and/or data code to the processor 702 to enable any one or more operations disclosed herein.

Figure 8A:
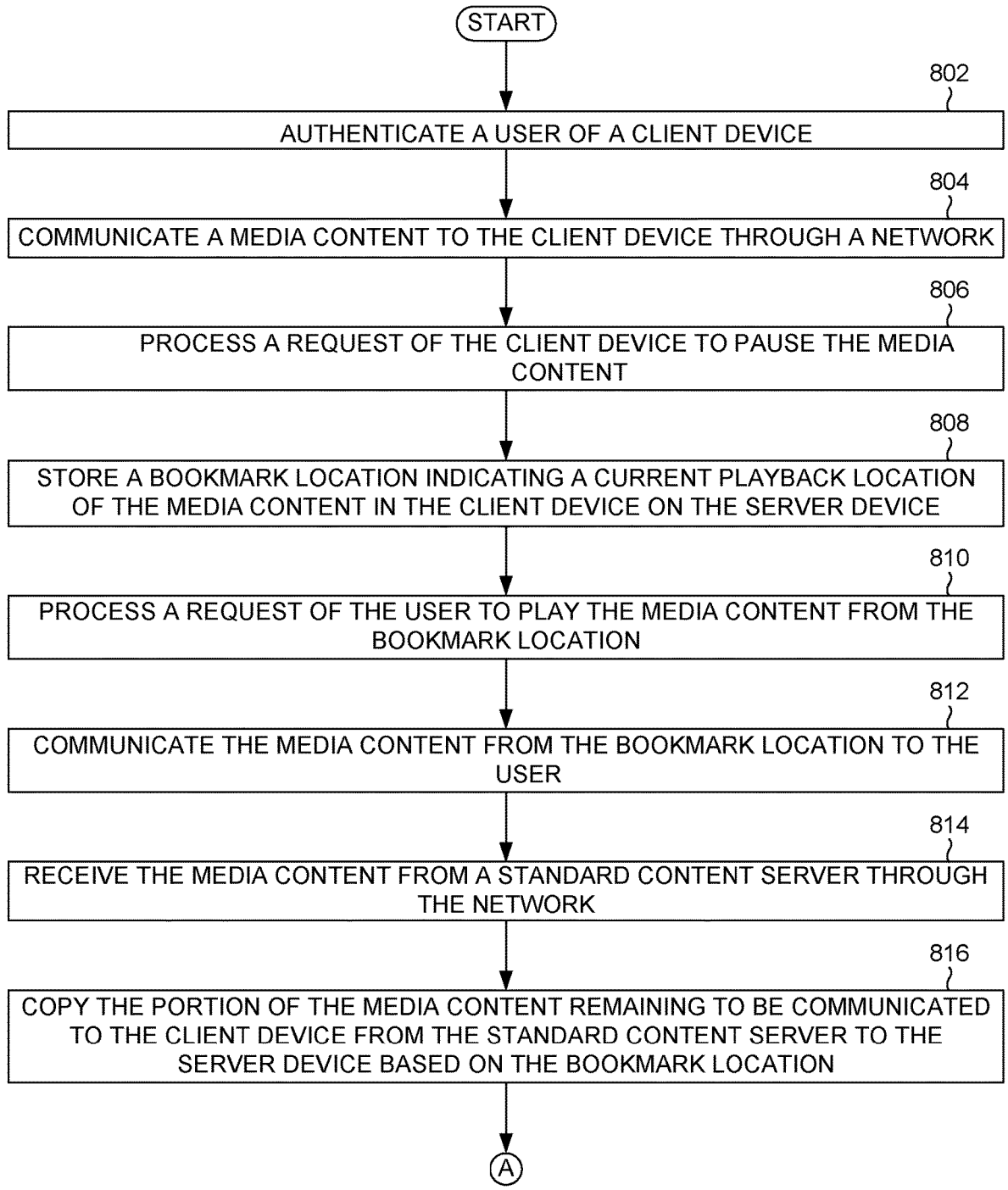
FIG. 8A is a process flow of storing a bookmark location indicating a current playback location of the media content in the client device on the server device, according to one embodiment.

FIG. 8A is a process flow of storing a bookmark location (e.g., using the bookmark module 308 of FIG. 3) indicating a current playback location of the media content 322 in the client device (e.g., the client device 100 of FIG. 1) on the server device (e.g., the server device 102 of FIG. 1), according to one embodiment. In operation 802, a user (e.g., the user 114 of FIG. 1) of a client device 100 may be authenticated. In operation 804, a media content (e.g., the media content 322 of FIG. 3) may be communicated to the client device 100 through a network (e.g., the network 104 of FIG. 1). In operation 806, a pause request of the client device 100 may be processed to pause (e.g., using the pause module 120A of FIG. 1) the media content 322.

In operation 808, a bookmark location (e.g., using the bookmark module 308 of FIG. 3) may be stored indicating a current playback location of the media content 322 in the client device 100 on the server device 102. In operation 810, a play request of the user 114 may be processed to play the media content 322 (e.g., video, audio, etc.) from the bookmark location. In operation 812, the media content 322 may be communicated from the bookmark location to the user 114. In operation 814, the media content 322 may be received from a standard content server (e.g., the standard content server 110A of FIG. 1) through the network 104.

In operation 816, the portion of the media content 322 remaining to be communicated to the client device 100 may be copied from the standard content server 110A to the server device 102 based on the bookmark location (e.g., using the record trigger module 306 of FIG. 3).

Figure 8B:
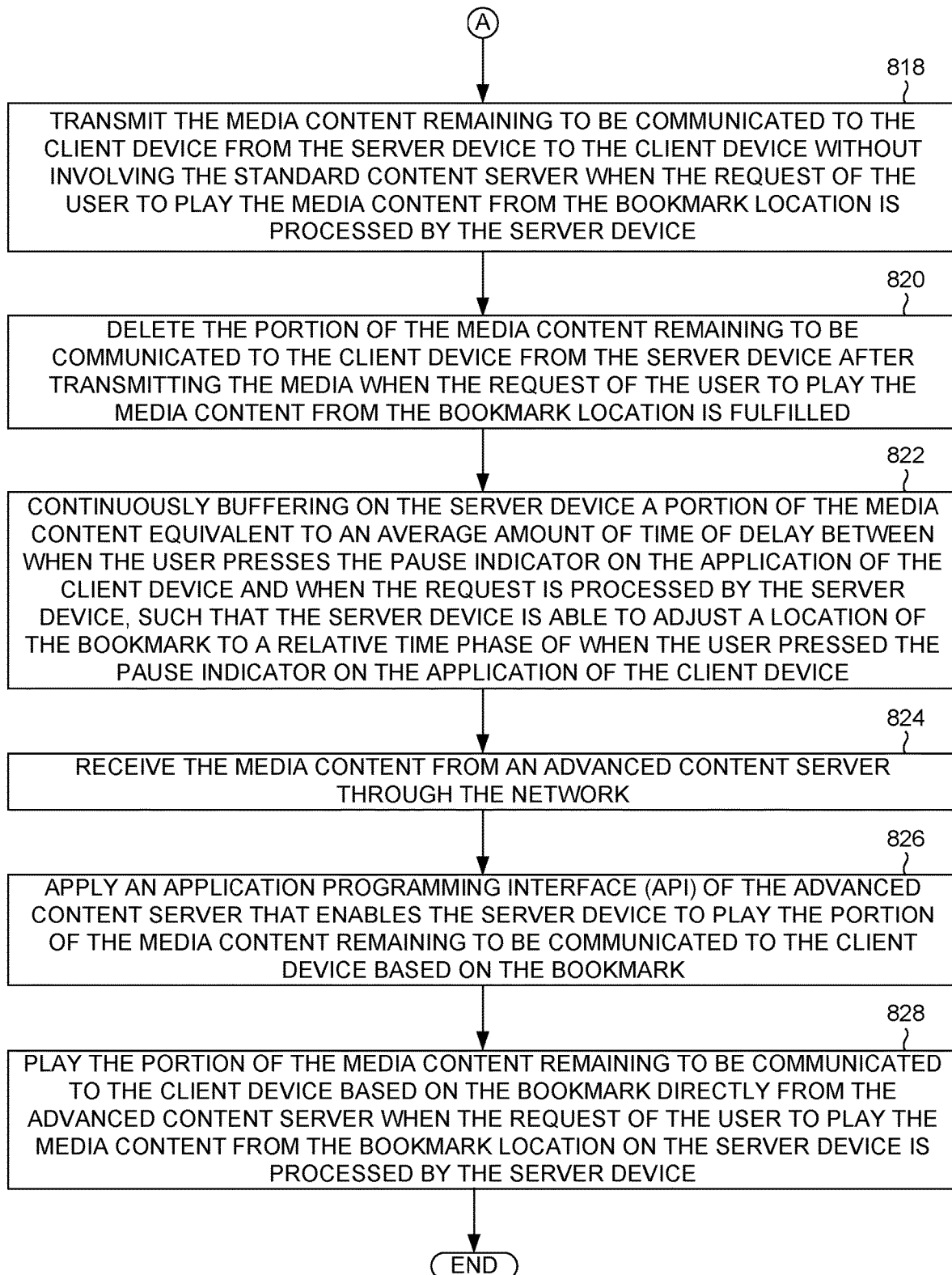
FIG. 8B is a process flow of applying an application programming interface (API) of an advanced content server that enables the server to play the portion of the media content remaining to be communicated to the client device based on the bookmark, according to one embodiment.

FIG. 8B is a continuation of the process flow of FIG. 8A, showing additional processes, according to one embodiment. In operation 818, the media content 322 remaining to be communicated to the client device 100 may be transmitted from the server device 102 to the client device 100 without involving the standard content server 110A when the play request of the user 114 to play the media content 322 from the bookmark location is processed by the server device 102. In operation 820, the portion of the media content 322 remaining to be communicated to the client device 100 may be deleted from the server device 102 after transmitting the media content 322 when the play request of the user 114 to play the media content 322 from the bookmark location is fulfilled. The media content 322 may be broadcasted live from the standard content server 110A without storage on the standard content server 110A, (e.g., such that standard content server 110A aggregates the media content 322 from user 114 generated content communities and professional media providers). The media content 322 may be at least 3 minutes in length.

The pause request of the client device 100 to pause (e.g., using pause module 120B of FIG. 1) the media content 322 may be stored temporarily on the client device 100 immediately after the user 114 presses a pause indicator (e.g., the pause indicator 602 of FIG. 6) on an application of the client device 100 to reduce an amount of time (e.g., using the time adjustment module 304 of FIG. 3) between when the user 114 presses the pause indicator 602 and when the pause request is processed by the server device 102 when a client-side media player (e.g., the client-side media player 118A of FIG. 1) is used to playback the media content 322.

The pause request may include a relative amount of time of a session of viewing the media content 322 on the client device 100 during the session. Then, in operation 822, the server device 102 may continuously buffer (e.g., using the buffer module 324 of FIG. 3) a portion of the media content 322 equivalent to an average amount of time of delay (e.g., using the delay module 302 of FIG. 3) between when the user 114 presses the pause indicator 602 on the application of the client device 100 and when the pause request is processed by the server device 102, such that the server device 102 is able to adjust a location of the bookmark (e.g., using the bookmark module 308 of FIG. 3) to a relative time phase of when the user 114 pressed the pause indicator 602 on the application of the client device 100. The user 114 may press the pause indicator 602 through any one of a remote control, a voice command, a pointing device action, and/or a tactile command. The media content 322 may be stored in a local storage (e.g., the local storage 106 of FIG. 1) coupled to the server device 102.

In operation 822, the media content 322 may be received from an advanced content server (e.g., the advanced content server 110B of FIG. 1) through the network 104. Then, in operation 824, an Application Programming Interface (API) of the advanced content server 110B that enables the server device 102 to play the portion of the media content 322 remaining to be communicated to the client device 102 based on the bookmark may be applied. In operation 826, the portion of the media content 322 remaining to be communicated to the client device 100 may be played based on the bookmark directly from the advanced content server 110B when the play request of the user 114 to play the media content 322 from the bookmark location on the server device 102 is processed by the server device 102.

A social community of users (e.g., the user 114 and other users) may be formed around bookmark locations of different users 114 across different ones of the media content 322 in a community pausing network (e.g., the community pausing network 116 of FIG. 1), such that users 114 of the community pausing network 116 share paused locations of media content 322 with each other through profiles associated with each user 114 of the community pausing network 116). The user 114 may be automatically authenticated through a unique hardware identifier of the client device 100. The client device 100 may be a personal computer, a mobile phone, a network-connected television, and/or a set-top box coupled to a standard television.

Figure 9:
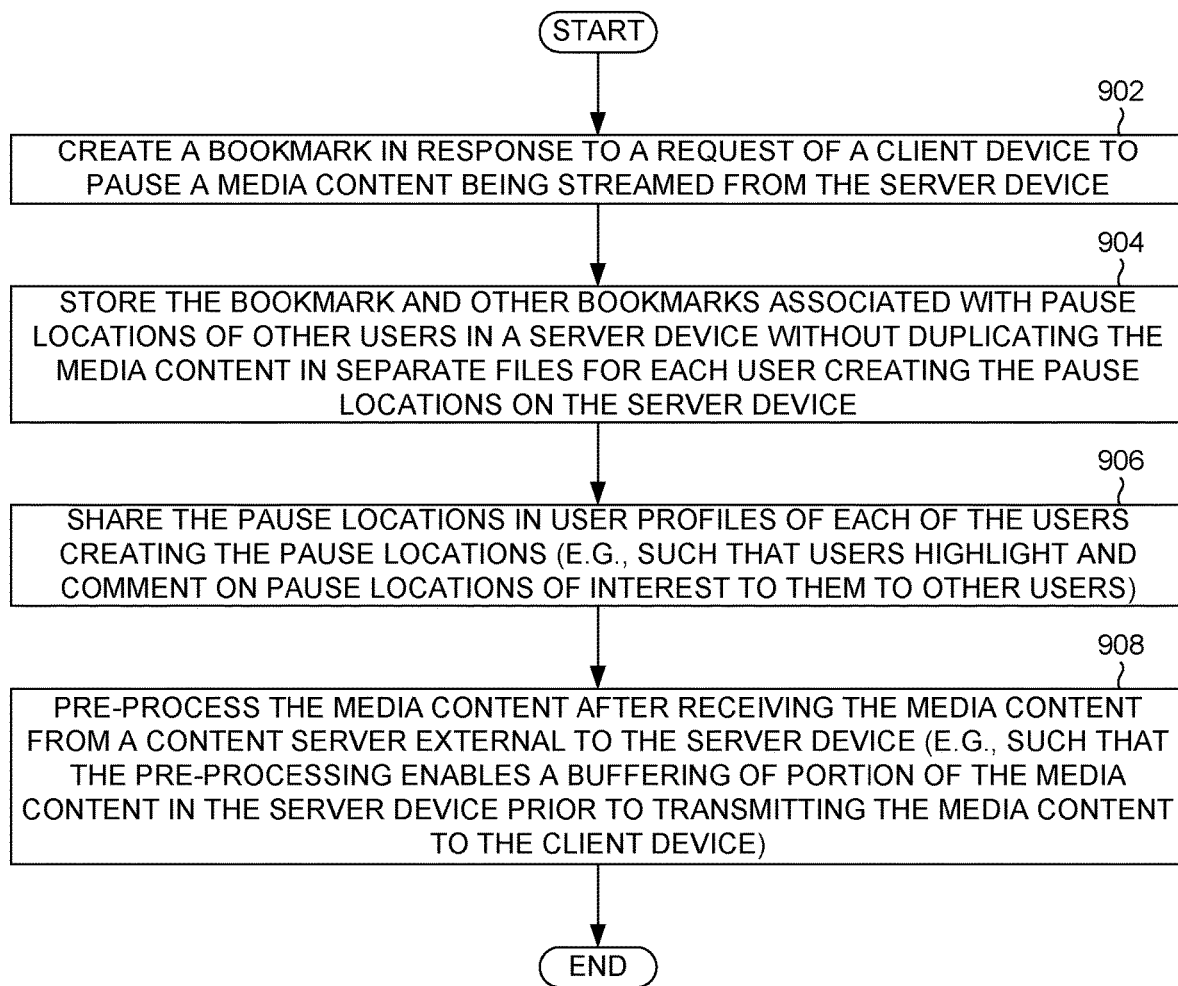
FIG. 9 is a process flow of creating a bookmark in response to a pause request of a client device to pause a media content being streamed from a server device, according to one embodiment.

FIG. 9 is a process flow of creating a bookmark in response to a pause request of a client device (e.g., the client device 100 of FIG. 1) to pause a media content (e.g., the media content 322 of FIG. 3) being streamed from a server device (e.g., the server device 102 of FIG. 1), according to one embodiment. In operation 902, a bookmark may be created in response to a pause request of the client device 100 to pause the media content 322 being streamed from the server device 102. In operation 904, the bookmark and other bookmarks associated with pause locations of other users 114 may be stored in the server device 102 without duplicating the media content 322 in separate files for each user 114 creating the pause locations on the server device 102 (e.g., using bookmark module 308 of FIG. 3). In operation 906, the pause locations in user 114 profiles of each of the users 114 creating the pause locations may be shared, such that users 114 highlight and comment on pause locations of interest to them to other users 114. Then, in operation 908, the media content 322 may be pre-processed after receiving the media content 322 from a content server external to the server device 102, such that the pre-processing enables a buffering of a portion of the media content 322 in the server device 102 prior to transmitting the media content 322 to the client device 100 (e.g., using the buffer module 324 of FIG. 3).

Particularly, the pause modules 120A and 120B, the communication module 208, the information packet transmit module 210, the delay module 302, a time adjust module 304, a record trigger module 306, a bookmark module 308, a streaming module 310, an authenticate module 312, a sharing module 318, a store module 320, and a buffer module 324 may be enabled using software and/or using transistors, logic gates, and electrical circuits (e.g., application specific integrated ASIC circuitry) such as the pause circuit, a pause modules 120A and 120B, a communication module 208, a information packet transmit module 210, a delay circuit, a time adjust circuit, a record trigger circuit, a bookmark circuit, a streaming circuit, an authenticate circuit, a sharing circuit, a store circuit, and a buffer circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A server comprising: a memory; and a processor configured to: receive a pause location indication from a first client device of a user, wherein the pause location indication indicates a location where playback of content was paused, wherein content played prior to the location was received by the first client device from a content source free of involvement of the server, and wherein unplayed content after the location was not received by the first client device; receive the unplayed content from the content source; store the unplayed content in the memory; and send the unplayed content to a second client device associated with the user, free of involvement from the content source, for the second client device to play the unplayed content; wherein the server is external relative to the first client device, the second client device, and the content source.

2. The server of claim 1, wherein the first client device comprises a first content player, and wherein the second client device comprises a second content player.

3. The server of claim 1, wherein the content includes one of a plurality of content types.

4. The server of claim 1, wherein the processor is further configured to adjust the location of the pause location indication based on a transmission delay.

5. The server of claim 1, wherein the first client device is configured to temporarily store the pause location indication to avoid a transmission delay.

6. The server of claim 1, wherein the pause location indication is usable with a plurality of content server types.

7. The server of claim 6, wherein at least one of the content server types includes an application programming interface (API).

8. A server comprising: a memory; and a processor configured to: receive a pause time indication from a first client device of a user, wherein the pause time indication indicates a time when playback of content was paused, wherein content played prior to the time was received by the first client device from a content source free of involvement of the server, and wherein unplayed content after the time was not received by the first client device; receive the unplayed content from the content source; store the unplayed content in the memory; and send the unplayed content to a second client device associated with the user, free of involvement from the content source, for the second client device to play the unplayed content; wherein the server is external relative to the first client device, the second client device, and the content source.

9. The server of claim 8, wherein the first client device comprises a first content player, and wherein the second client device comprises a second content player.

10. The server of claim 8, wherein the content includes one of a plurality of content types.

11. The server of claim 8, wherein the processor is further configured to adjust a time of the pause time indication based on a transmission delay.

12. The server of claim 8, wherein the first client device is configured to temporarily store the pause time indication to avoid a transmission delay.

13. The server of claim 8, wherein the pause time indication is usable with a plurality of content server types.

14. The server of claim 13, wherein at least one of the content server types includes an application programming interface (API).

15. A server comprising: a memory; and a processor configured to: receive a playback location indication from a first client device of a user, wherein the playback location indication indicates a location in content that was played prior to being paused, wherein content played prior to the location was received by the first client device from a content source free of involvement of the server, and wherein unplayed content after the location was not received by the first client device; receive the unplayed content from the content source; store the unplayed content in the memory; and send the unplayed content to a second client device associated with the user, free of involvement from the content source, for the second client device to play the unplayed content; wherein the server is external relative to the first client device, the second client device, and the content source.

16. The server of claim 15, wherein the first client device comprises a first content player, and wherein the second client device comprises a second content player.

17. The server of claim 15, wherein the content includes one of a plurality of content types.

18. The server of claim 15, wherein the processor is further configured to adjust the location of the playback location indication based on a transmission delay.

19. The server of claim 15, wherein the first client device is configured to temporarily store the playback location indication to avoid a transmission delay.

20. The server of claim 15, wherein the playback location indication is usable with a plurality of content server types.

* * * * *